No. 640,096. Patented Dec. 26, 1899.
W. S. & C. I. CORBY.
MACHINE FOR MAKING AND WORKING DOUGH.
(Application filed May 29, 1899.)
(No Model.) 4 Sheets—Sheet 1.
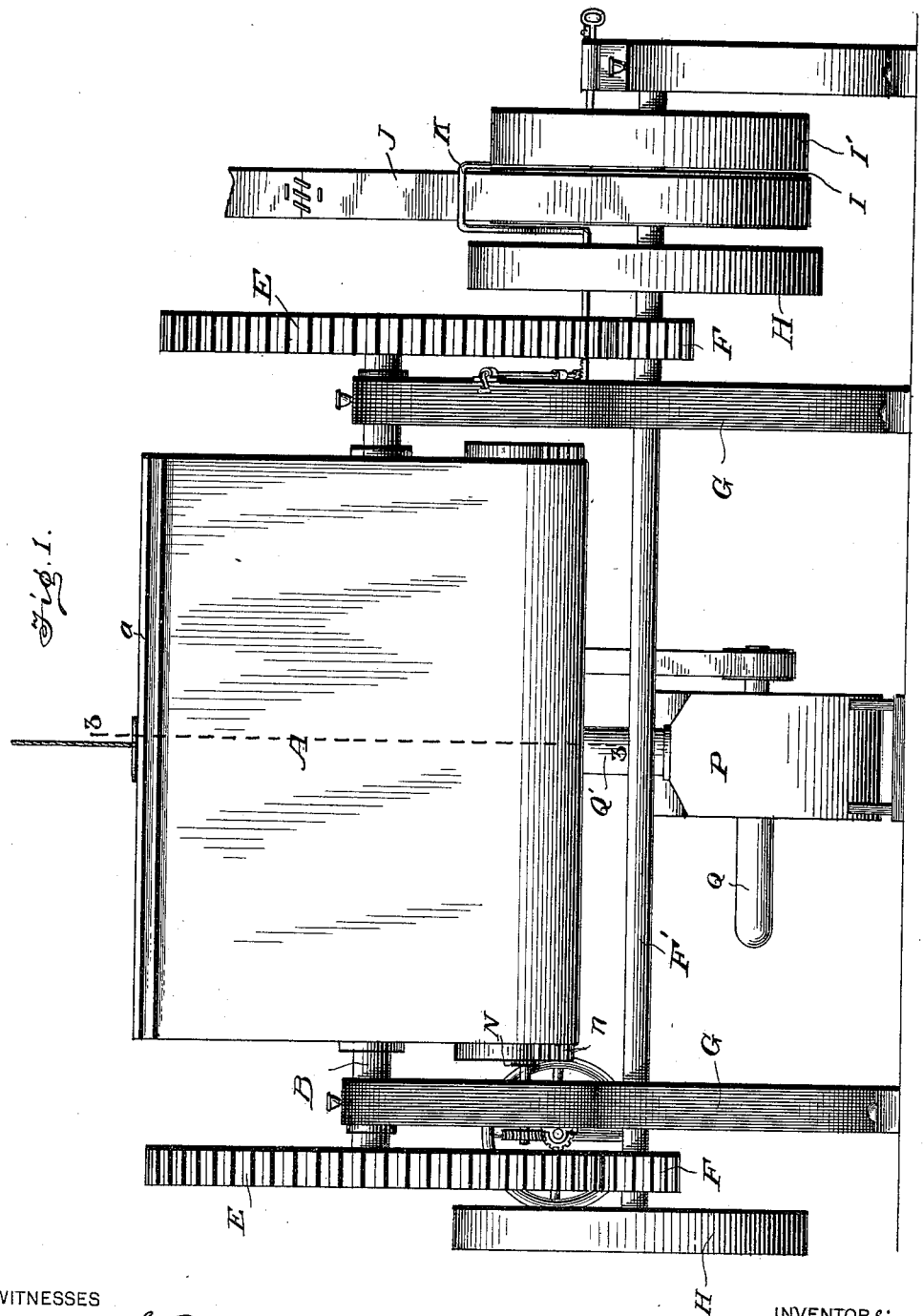

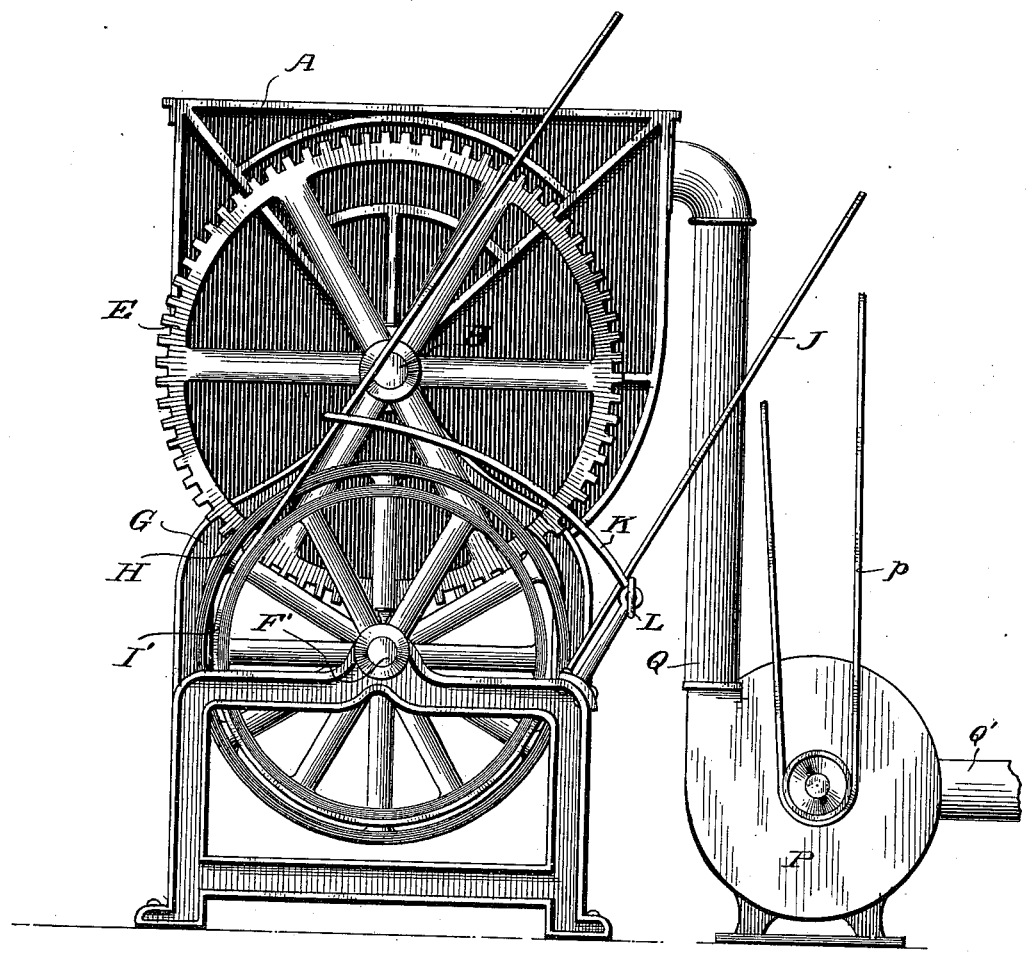

No. 640,096. Patented Dec. 26, 1899.
W. S. & C. I. CORBY.
MACHINE FOR MAKING AND WORKING DOUGH.
(Application filed May 29, 1899.)
(No Model.) 4 Sheets—Sheet 3.
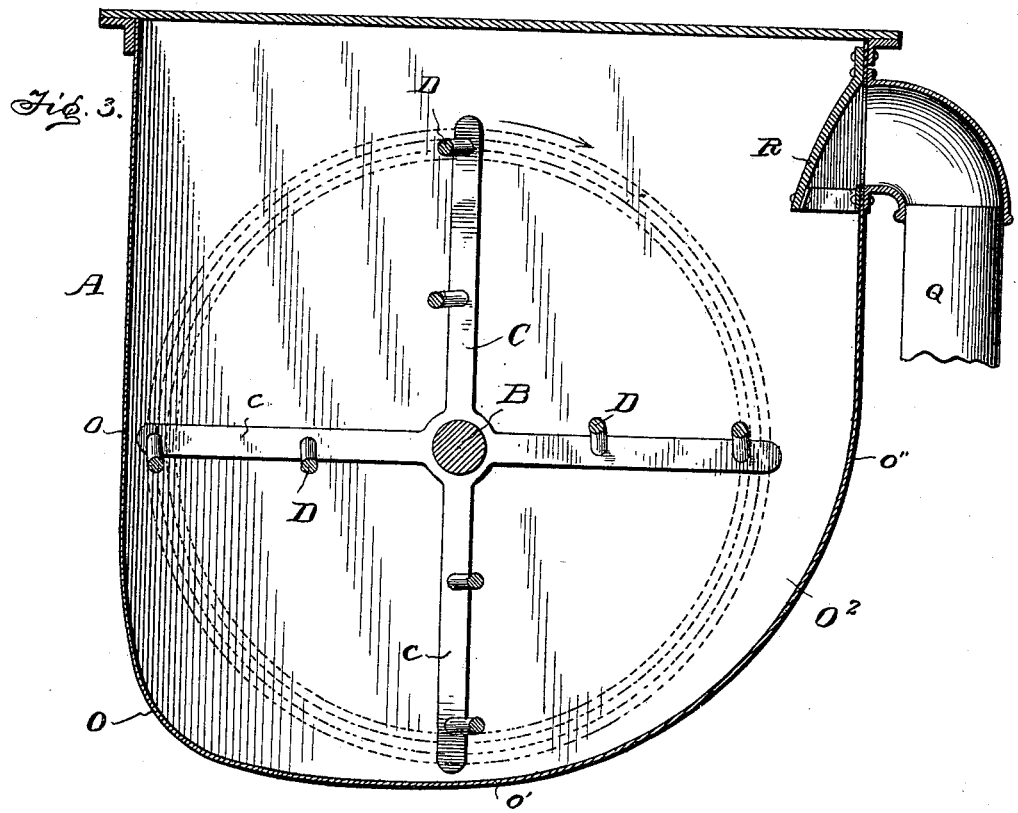
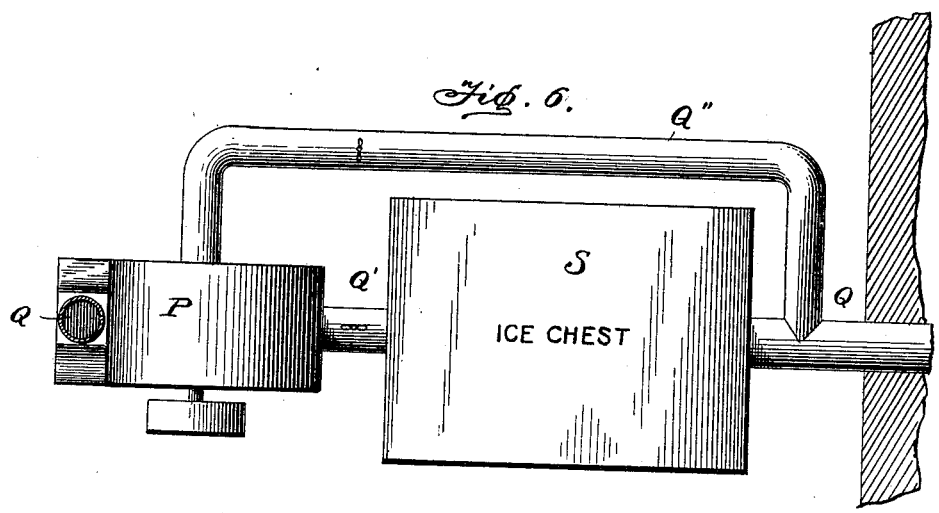
WITNESSES
INVENTORS:
William S. Corby and
Charles I. Corby
By J. S. Barker
Atty.

No. 640,096. Patented Dec. 26, 1899.
W. S. & C. I. CORBY.
MACHINE FOR MAKING AND WORKING DOUGH.
(Application filed May 29, 1899.)
(No Model.) 4 Sheets—Sheet 4.

WITNESSES: INVENTORS

UNITED STATES PATENT OFFICE.

WILLIAM S. CORBY AND CHARLES I. CORBY, OF WASHINGTON, DISTRICT OF COLUMBIA.

MACHINE FOR MAKING AND WORKING DOUGH.

SPECIFICATION forming part of Letters Patent No. 640,096, dated December 26, 1899.

Application filed May 29, 1899. Serial No. 718,747. (No model.)

*To all whom it may concern:*

Be it known that we, WILLIAM S. CORBY and CHARLES I. CORBY, citizens of the United States, residing at Washington, in the District of Columbia, have invented certain new and useful Improvements in Machines for Making and Working Dough, of which the following is a specification.

Our invention consists in a new or improved machine or apparatus for making and manipulating dough, it being particularly adapted for the carrying out of a process similar to that described in our Patent No. 629,239, dated July 18, 1899, which patent was issued on an application filed as a division of our application, Serial No. 659,109, filed November 19, 1897.

In the accompanying drawings we have illustrated our machine in its most approved form, and, referring to such drawings—

Figure 4:
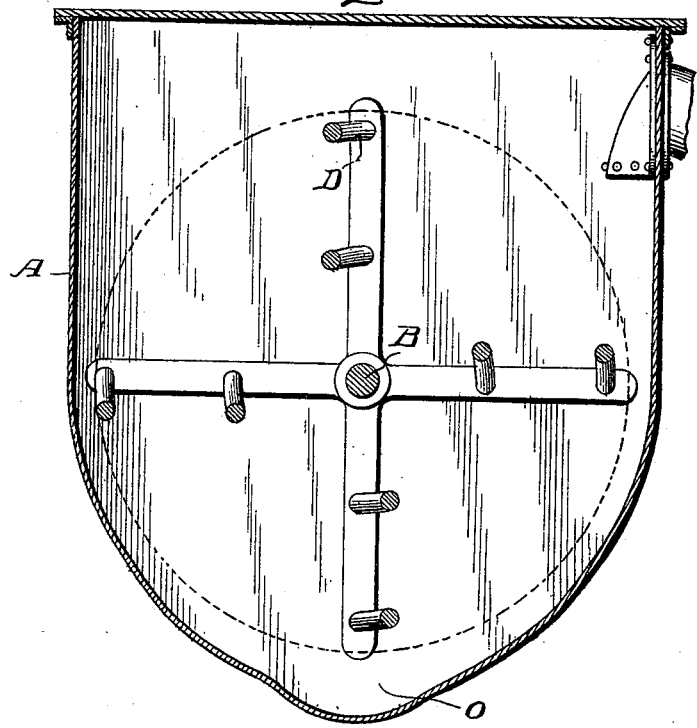
Figure 5:
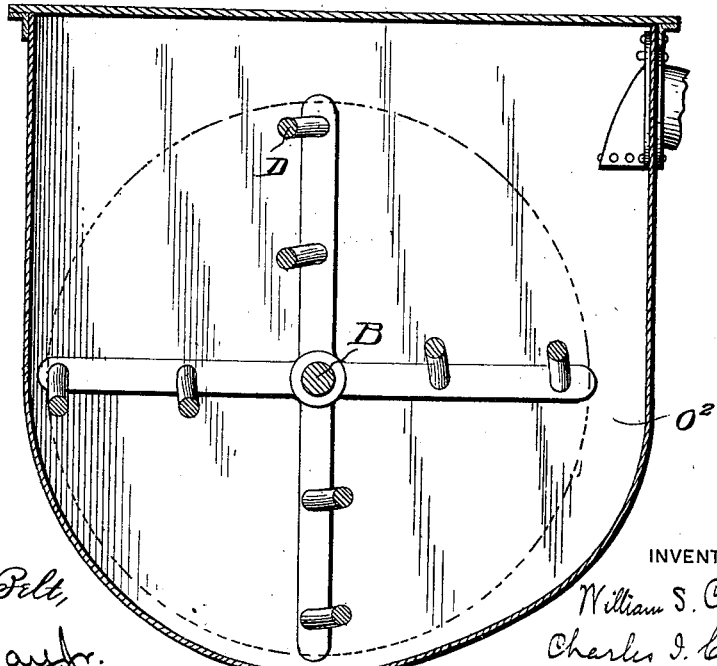

Figure 1 is a side elevation of the machine. Fig. 2 is an end view. Fig. 3 is a cross-sectional view taken on the line 3 3 of Fig. 1. Figs. 4 and 5 are cross-sectional views, on a reduced scale, showing somewhat-different forms of the casing or receptacle in which the dough is manipulated. Fig. 6 is a plan view illustrating a cooling device or refrigerator in connection with the air-forcing apparatus.

In the drawings, A represents the casing or receptacle in which the dough ingredients are placed and where the dough is mixed and manipulated. In this casing or receptacle is mounted a revolving shaft B, which carries a pair of spiders C, and a series of longitudinal bars extending between the spiders. These parts—the shaft, spiders, and bars—are in their main features of construction and arrangement preferably similar to the like parts of the apparatus shown in our aforesaid application, Serial No. 659,109, and need not be here described in detail.

As clearly indicated in Fig. 3 of the drawings, the bars D are so disposed that no two of them follow exactly the same circumferential path, as we have found that this arrangement is the most effective one to secure a rapid mixing of the dough and shredding or drawing out thereof into sheets and membranes. We have discovered, however, that it is best to have the several arms $c$ of the spiders all of the same length, nothwithstanding the arrangement of the bars D, as stated, as by so making the arms of the spiders the beater is better balanced and runs more smoothly and steadily than when the spider-arms vary in length.

The character of the work which the bars have to perform—that is to say, the mixing of the dough in the manner fully described in our said applications—and the high speed which they have to maintain while performing their work puts great and unequal strains upon the "beater" (which term we use to designate the shaft, spiders, and bars taken together) and the beater-driving mechanism at successive moments of time, and we have therefore devised and prefer to use a peculiar driving mechanism, which gives to the beater a very steady and uniform motion.

The beater-shaft is provided at its ends with gear-wheels E, with which mesh gear-pinions F, mounted upon a counter-shaft F', supported in the framework G and located, preferably, directly below the casing A. In order to give a steady motion and uniform speed to the beater, even when subjected to the unequal loading or work to which it is put in ordinary operation, as before referred to, we prefer to mount upon the counter-shaft F' two balance or fly wheels H H, one near each end.

I I' represent the fast and loose belt-pulleys, and K the shifter for the driving-belt J. This shifter is carried by a sliding bar L, with which is connected suitable operating mechanism.

$n$ represents a segmental rack carried by the casing, one such rack being preferably employed at each end of the casing, and N represents the gearing, which engages with such rack or racks and by means of which the casing may be turned upon the shaft B as an axis in order to discharge its contents or for other purposes.

The shape or construction of the casing or receptacle A is peculiar, these peculiarities being best illustrated in Fig. 3. Instead of making the lower part of the casing—that is, the part below the axis of the shaft B—concentric with such shaft, as in the apparatus shown in the earlier of our said applications, we prefer to make it of an eccentric construction, as indicated in the drawings, for the purpose, in the first place, of getting a better aeration of the dough; in the second place, to facilitate the shredding or drawing out into sheets or membranes of the dough, and, in the third place, to generally improve the operation of the apparatus and make it run more easily or with a less expenditure of power.

One change and improvement in the construction of the casing or receptacle A consists in so shaping it as to produce an eccentrically-disposed portion, pocket, or bulge O, arranged outside of the circular path traveled by the outermost of the beater-bars D and extending longitudinally of the casing, preferably its entire length. This bulge or pocket portion of the inner wall of the casing is preferably curved, as indicated in the drawings, and joins with portions of the inner casing-wall where the beater-bars pass very close to such walls, as at $o$ and $o'$. The inner walls of the casing from the lines $o$ and $o'$, respectively, toward the bulge or pocket O are preferably for a short distance tangential, or substantially so, to a circle described from the axis of the shaft B. The location of the eccentric portion O of the casing circumferentially of the path of the beater-bars may be varied, though we prefer that it should be situated in the lower forward segment of the casing, as we have found that the best results are secured when it is so located, especially when this feature of construction is associated with another feature of construction presently to be described. The word "forward" when used in this case and as in the last sentence refers to that part of the apparatus on the side toward which the beater-bars travel when passing below the shaft B. When the eccentric portion O of the casing is located as just described, the lines $o$ and $o'$ are respectively horizontally in front of the beater-shaft and vertically below it, and in a machine having a beater the outer bar D of which describes a circle of twenty-inch radius such beater-bar should preferably travel within about an inch and a half of the inner casing-wall at the lines $o\,o'$.

Another feature of construction which we have found to improve the working of our process and apparatus consists in making a portion of the interior wall of the casing to gradually flare or expand from a part of the casing-wall which is situated close to the path of the outermost beater-bars. This part of the casing is represented by $O^2$, and in the form of our invention illustrated in Fig. 3 the part $O^2$ occupies the lower rear segment of the casing expanding upward and rearward from the line $o'$ to about the line $o''$, which is horizontally in rear of the shaft B. In a machine of the size hereinbefore referred to the space $O^2$, situated between the casing-wall and the outermost beater-bar path, should be about an inch and a half across at the line $o'$ and from there gradually increase to about six inches at the line $o''$. The advantages incident to these features of construction will be set forth more in detail hereinafter.

The upper portion of the casing or receptacle A is preferably open and is provided with a cover $a$, which is closed during the working of the machine. The cover is preferably flat, and there is therefore a considerable air-space within the casing above the path of the beater.

In order that the necessary quantities of air may be supplied to the interior of the casing during the operation of the machine, we have combined with the machine an air-forcing apparatus.

P designates a blower or fan arranged to be driven by a belt $p$, connected with any suitable driving apparatus and provided with an air-duct Q, leading into the casing A. The fan may take its supply of air from any suitable source, though we prefer for the sake of purity to obtain it from the outer atmosphere, and in the drawings have represented a supply-pipe Q', leading to the fan. The air forced into the casing should be made to freely and forcibly find its way into all parts of the casing or receptacle A, particularly to those parts where the beater is most actively acting upon the dough, and which in a machine organized as herein shown and described is the lower portion or the part below the axis of the beater. To effect this thorough and positive distribution of air, we lead the duct Q into the casing in its upper rearward portion, and adjacent to the mouth of this duct we arrange means for directing this air downward along the rear wall of the casing and in the general direction in which the beater is moving. The means which we employ for thus directing the air is a shield or deflecting-plate R, arranged over and opposite the mouth of the duct Q.

It will be understood that when the air-forcing apparatus just described is applied to or combined with a mixing vessel which may be tilted or turned upon its axis, such as illustrated in the drawings, the connections of the air-pipe Q with the casing A should be such that it may be easily broken or disconnection easily made whenever it is desired to tilt the vessel, as in discharging the mixed dough.

We have discovered that in carrying out our process of manufacturing dough by means of an apparatus such as that herein shown considerable heat is generated during the working of the dough and that unless an abundant supply of air is furnished the dough will become so hot as to be injuriously affected. By combining with the dough mixing and working apparatus an air supplying or forcing apparatus we are enabled to keep down the heat and maintain the proper temperature, the air as it becomes heated being forced out of the apparatus by the fresh air, which is caused to take its place. We have also discovered that better results are obtained when the temperature of the air supplied to the casing A is lower than the temperature at which the dough should be maintained while being mixed and worked and lower than the ordinary temperature of the air in this latitude during the summer season. We have therefore combined with the air-forcing apparatus means for cooling the air before it enters the casing A. This is represented in Fig. 5, wherein S represents an air cooler or refrigerator which may be of any approved or well-known construction. It may be arranged on either side of the fan—that is, in connection with either the duct Q or the duct Q'. When a cooling device is employed, there should be provision made for disconnecting it and supplying the casing with air at the ordinary temperature of the air whenever this is found desirable. In the drawings we have indicated a by-duct Q'', leading around the air refrigerator or cooler. By means of suitable valves, which need not be illustrated or described in detail, the air supplied by the fan can be passed through the refrigerator or through the by-duct Q'' and around the refrigerator at will.

Among the peculiar and distinguishing features of our process are the thorough dissemination of air through the entire mass of dough while being mixed or worked in order to thoroughly aerate the dough and the drawing out, shredding, or sheeting of the dough after it has been formed into a coherent mass, which latter operations tend to facilitate the complete and perfect union between the water supplied to the dough ingredients and the various constituents of the flour, particularly those consitutents which when united with the water form gluten, and which operations also tend to facilitate the permeation of the entire dough mass with air. This thorough and complete permeation of the dough mass with air not only tends to make the mass light and porous, but also supplies oxygen in a manner to greatly hasten and invigorate the growth of the yeast and also to oxidize certain substances in the flour which are found to have a deleterious effect in the formation of gluten and in the general appearance of the dough if allowed to remain in an unoxidized condition.

The peculiar shape which we give to the casing or receptacle A, as has been hereinbefore described, is for the purpose of the better accomplishing the aerating and shredding or drawing out operations just referred to. It will be understood that were the wall of the casing to be arranged close to the path of the beater-bars and concentric thereto entirely around the beater and the beater were to be run at the speed which we give it in our machine there would be a constant drag upon the beater incident to the centrifugal force engendered by the motion of the beater tending to throw off the dough from the axis of rotation of the beater and the concentric wall of the casing, confining such dough, so that it could not escape the path of the beaters. This would make the machine run hard. It would also tend to prevent a thorough and complete distribution of air throughout the casing and to that extent would interfere with the proper aeration of the dough. By forming the casing with an eccentric portion, as indicated at O in the drawings, the dough is permitted to escape under the action of centrifugal force from the beater-bars and to collect in the pocket formed by such construction. The dough, however, does not remain in such pocket, but is picked up and drawn therefrom by the rapidly-passing beater-bars, the operations of the dough escaping into the pocket and being drawn out therefrom recurring with great frequency and rapidity. We have found that this construction and the results that are incident thereto cause the machine to run more easily, cause a better aeration of the dough by giving a space in which the air forced into the chamber may collect, and cause a more rapid and perfect drawing out or shredding or sheeting of the dough than would occur were the wall of the casing concentric to the path of the beater. The masses of dough which collect in the pocket or bulge O are by the rapidly-passing beater-bars turned and folded over and drawn out therefrom particle by particle, so that, as stated, the air is thoroughly worked into the dough and the latter shredded and sheeted. This feature of construction—the forming of the part of the casing so that there is a longitudinal pocket eccentric to the path of the beater-bars—is not necessarily limited to the specific embodiment thereof illustrated in Fig. 3 of the drawings, as such eccentric portion might be arranged at other places relative to the beater than the lower forward segment, and it is not necessary that it should be associated with a construction of casing like that indicated at $O^2$. In Fig. 4 of the drawings there is indicated a form of casing in which the eccentric bulge or pocket O is situated directly below the axis of the beater and where the eccentric construction $O^2$ is omitted.

In the manipulating of the dough to accomplish a thorough aeration thereof and the drawing out of the dough into sheets, membranes, and shreds it is found that the best results are obtained when the sheets or membranes of dough are folded or doubled one upon another, so as to inclose or confine air between such sheets. By constructing the casing with a portion which flares or expands relative to the path of the beater-bars, as indicated at $O^2$, this sheeting of the dough and folding the sheets one upon another to confine or inclose bodies of air is facilitated, and especially is this true when the said flaring part of the casing is situated relative to the air-pipe Q, as shown in the drawings. The rapid rotation of the beater-bars causes particles or small masses of the dough to be thrown off by centrifugal force, and in practice we find that these thrown-off particles of dough collect in the largest quantities against that part of the wall of the casing or receptacle which is just below the opening from the air-duct. The particles and masses of dough which leave the beater and are caught by the casing-wall at this point are presently caught by a succeeding moving beater-bar and are drawn out and sheeted or shredded, and this takes place in the immediate presence of the incoming volumes of air.

In Fig. 5 of the drawings the feature of construction just described is shown as embodied in a form of machine in which the eccentric bulge or pocket feature is lacking.

The machine which we have herein illustrated and described may be employed to accomplish the initial mixing of the dough ingredients to first form them into a coherent mass, and the operation of the machine after accomplishing such initial mixing may be continued without interruption until the dough has become thoroughly blended and has attained those qualities of smoothness of texture, lightness or aeration, and thoroughness of union and mixture of the ingredients which can be accomplished only by the carrying out of our process of dough manufacture and manipulation so that the perfect formation of the dough is accomplished by one initial and complete operation, or the dough ingredients may be first mixed to form a coherent mass, either by hand or by an apparatus different from that herein shown, and such coherent mass of dough material may be subsequently treated in our machine in order to aerate and shred or sheet it, as described. When our machine is used as just described—that is to say, to act upon an already-formed coherent mass of dough material—such action may take place immediately after the dough ingredients are brought together and formed into a coherent mass or after such mass of dough material has been allowed to stand for a length of time sufficient to allow the yeast or other leaven employed to act thereon and lighten it, and in either case advantageous results are accomplished.

Having thus described our invention, what we claim, and desire to secure by Letters Patent, is—

1. In a dough-working machine, the combination of the rotary beater, and a casing in which the beater is mounted, having an eccentric bulge or pocket, substantially as set forth.

2. In a dough-working machine, the combination of a revolving beater and a casing in which the beater is mounted, formed with an eccentric pocket or bulge arranged in the lower, forward part of the casing, substantially as set forth.

3. In a dough-working machine, the combination of a revolving beater, mechanism for driving the beater at a relatively high speed, and a casing having a bulge or pocket eccentric to the axis of rotation of the beater, and arranged below the axis thereof, and longitudinally on the side toward which the lower portion of the beater moves in its rotation, substantially as set forth.

4. In a dough-working machine, the combination of a rotary beater, and a casing having a pocket or bulge opening inward and eccentric to the path of the beater, the wall of the casing on either side of the said pocket or bulge approaching close to the path of the beater, substantially as set forth.

5. In a dough-working machine, the combination of a rotary beater having a series of longitudinally-arranged beater-bars, and a casing in which the beater is mounted, the casing being formed with a longitudinal pocket or bulge, O, outside of the circular path of the beater-bars, the said bulge or pocket terminating along longitudinal lines, o and o', of the inner casing-wall, arranged close to the path of the outermost beater-bars, substantially as set forth.

6. In a dough-working machine, the combination of a rotary beater and a casing in which the beater is mounted, the inner wall or surface of the casing, on one side of the beater, being eccentric to the circular path of the beater, and flaring or expanding from such path, substantially as set forth.

7. In a dough-working machine, the combination of a rotary beater, and a casing in which the beater is mounted, having the portion of its inner wall below the axis of the beater, and on that side where the beater-bars move downward, eccentric to the beater, and flaring or expanding in a direction opposite to the path followed by the beater-bars, substantially as set forth.

8. In a dough-working machine, the combination of a rotary beater, a casing in which the beater is mounted, and an air-duct leading into the casing, the inner wall of the casing being eccentric to the path of the beater, adjacent to the opening of the air-duct thereinto, substantially as set forth.

9. In a dough-working machine, the combination of a rotary beater, a casing in which the beater is mounted, and an air-duct leading into the casing, the inner wall of the casing being eccentric to the path of the beater adjacent to the opening of the air-duct, and flaring or expanding toward the said opening, substantially as set forth.

10. In a dough-working machine, the combination with the beater, of a casing in which the beater is mounted, the interior wall of the casing along the longitudinal lines o and o' being disposed close to the outermost path traveled by the beater, and the wall between the said lines on one side being formed into a pocket or eccentric bulge, O, and on the opposite side from said bulge being eccentric and converging toward the path of rotation of the beater, substantially as set forth.

11. The combination, in a dough-working machine, of a casing, a rotary beater mounted therein, means for forcing air into the casing, and means for directing the air after it enters the casing, whereby it is caused to be distributed through all parts of the casing, substantially as set forth.

12. In a dough-working machine, the combination of a casing, a beater mounted upon a horizontal axis within the casing, means for rotating the beater, means for forcing air into the upper part of the casing, and means within the casing for directing such air into the lower parts thereof, substantially as set forth.

13. In a machine for working dough, the combination of a casing, a rotary beater mounted therein, means for forcing air into the casing, and means for giving such air, after entering the casing, a direction of movement similar to that of the beater, substantially as set forth.

14. In a dough-working machine, the combination of a casing, means situated therein for working the dough, means for forcing air into the casing, and a cooler for such air, substantially as set forth.

15. In a dough-working machine, the combination of a casing, a rotary beater mounted therein, a fan or blower connected with the interior of the casing, and means for running such fan, whereby constantly-renewed quantities of air are forcibly supplied to the interior of the casing, substantially as set forth.

WILLIAM S. CORBY.
CHARLES I. CORBY.

Witnesses:
J. S. BARKER,
ALBERT HARPER.